Patented May 1, 1934

1,956,727

UNITED STATES PATENT OFFICE 1,956,727

WEARING APPAREL AND A METHOD OF PRODUCING THE SAME

Herbert W. O'Neill, Berlin, Conn., assignor to The Stanley Chemical Co., East Berlin, Conn., a corporation of Connecticut No Drawing. Application October 28, 1930, Serial No. 491,725

6 Claims. (Cl. 91—70)

This invention relates to wearing apparel and a method of producing the same.

As is well known, most leather as used in the fabrication of boots and shoes, has a characteristic known as "breathability". That is, leather is sufficiently porous to permit passage of air and the shoe is said to "breathe". The same thing is true of canvas and similar fabrics used in the manufacture of uppers in cheaper footwear, e. g. the so-called "tennis shoes" or "sneakers". Both leather and fabric, however, are unsuitable for certain uses because they lack resistance to water. Rubber is commonly used in boots and shoes, coats and the like, for its water-resistant qualities. But rubber is objectionable for various purposes because it lacks "breathability" on account of its homogeneous composition. The bad effect of wearing all-rubber shoes in well known. In the tennis-shoe type of footwear, for example, canvas is used to form the uppers because rubber, having no breathability, would have the objectionable effect referred to. But this breathability of the canvas involves the lack of water-resistant qualities.

It is an object of the present invention to provide footwear and other wearing apparel and a method of producing the same that avoids this disadvantageous alternative.

In carrying out the method of the present invention, there is formed a stable compound of rubber and lacquer, for example, such as is described in an application filed by me of even date herewith, Serial No. 491,819.

As set forth in that application, the term "lacquer" is to be understood to mean a solution of a cellulose product, with or without resins, gums or plasticizers, or of resins, with or without gums or plasticizers. An example of such lacquer is a solution of nitrocellose. The phrase "rubber solution" is to be understood to include a true solution, an emulsion, and, when such ingredients as pigments, fillers and accelerators are used, the mixture including the latter.

In the following description and claims, nitrocellulose has been referred to as the basic lacquer-forming product, but it is to be understood that nitrocellulose has been recited as an example and that equivalents may be substituted without departing from the invention.

As described in the application referred to, in forming the rubber-lacquer compound, a rubber solution is formed, the solution containing such pigments, fillers, sulphur and other accelerators, as may be desired. These various ingredients are mixed in a mill in the usual manner. This rubber solution may, for example, be basically crepe rubber stock cut with gasoline. To this rubber solution is added a nitrocellulose solvent, e. g. ethyl acetate, which may be churned into the rubber solution. Thereafter nitrocellulose is added, preferably in the form of a solution, and this also may be churned in. True homogeneity of the two solutions, be it by combination or otherwise is evidenced by an increase in viscosity over the viscosity of either ingredient alone. If desired, the viscosity may be reduced by the addition of any suitable thinner.

The relative proportions of rubber and lacquer may vary within wide limits, depending on the ultimate product desired. The more the product is to approach rubber in its characteristics, the greater is the proportion of rubber used in making the compound. Similarly, the more the product is to approach lacquer in its characteristics, the greater is the proportion of lacquer used.

For certain purposes, more or less flexibility is desired in the ultimate product. This may be obtained by the addition of a suitable plasticizer. Since the greater the relative amount of lacquer in the mixture the less the flexibility, the amount of plasticizer to be added is substantially in direct proportion to the amount of lacquer and the degree of flexibility desired. If a plasticizer is to be used, it may be satisfactorily added, with brisk churning, after churning in the lacquer. In case the compound tends to become granular upon addition of the plasticizer, this condition may be corrected by the addition of a suitable thinner.

It is now considered that one of the essential features of the method described is the presence at all times of sufficient solvent for all ingredients used. One means of securing this condition is to add solvent for each ingredient before the addition of the ingredient itself, even when the ingredient is added in solution form. Moreover, it has been found that more satisfactory results are obtained and the combination effected more rapidly if a small amount of solvent is added after the addition of the nitrocellulose and again after the addition of the plasticizer, if any. For example, after the addition of the nitrocellulose there may be added a mixed solvent for the rubber and the nitrocellulose and after the addition of the plasticizer there may be added a mixed solvent for the rubber, the nitrocellulose and the plasticizer. This mixed solvent may conveniently be a mixture of ethyl acetate and toluol. The former is a solvent for nitrocellulose, the latter for rubber, and any common plasticizer is soluble in one or the other.

In carrying out the invention in its entirety, the compound described is applied as a coating, in one or more layers, to a fabric or other base and the proper degree of breathability is obtained by controlling the rate of evaporation of the solvents in the coating after the coating has been applied. For example, instead of permitting the solvents to evaporate at room temperatures, the applied coating may be subjected to the sudden application of heat. This effects a sudden evaporation of the solvents present, with a resulting "boiling" effect in the coating. This gives the coating a porous or cellular structure and because of the presence of the nitrocellulose there is substantially no tendency of the coating compound to flow back to a homogeneous condition.

In controlling the degree of breathability there is a relation between the time of heat application and the choice of solvents. That is, if the heat application is to be delayed any substantial time after the coating is applied, solvents having a high boiling point are used to minimize ordinary evaporation during the interval. If the heat application is to be immediate, the boiling point of the solvents is largely immaterial.

Subsequent steps depend on the type of article being produced.

For certain articles, e. g. jackets, the coated fabric is subjected to a curing operation, preferably by a "dry heat" cure. The curing step is substantially the same as in the case of rubber coatings. The coated fabric may then be cut and fashioned into the desired article.

In the case of certain types of footwear, e. g. tennis shoes, the coated fabric is cut and formed into an upper before curing. This upper is assembled with the usual rubber sole in conjunction with a rubber foxing. The assembly is then cured as described. In order to obtain a proper cure and a proper adhesion of the foxing, it is necessary to have the coating compound, the sole and the foxing cure at the same temperature and in the same time interval. To attain this end a suitable accelerator for the coating compound can be selected in view of the curing condition with respect to the sole and foxing.

It will be understood that the invention includes other types of soles and other methods of assembling sole and upper and that the term "shoe" is used in a comprehensive sense to include footwear in general.

While the sudden evaporation of the solvents and the curing operation have been described above as successive steps, it is to be understood that these two steps may be carried out more or less simultaneously. For example, in making footwear of the "tennis shoe" type above described, the sudden application of heat for controlling the evaporation may conveniently be the heat of the curing step.

The cured coating described has the water-resistant qualities characteristic of rubber but it does not have the homogeneous composition of rubber. On the contrary, the presence of the nitrocellulose and the control of the rate of evaporation give the compound a cellular or porous structure that permits the passage of air and prevents any tendency of the rubber in the compound to flow back into homogeneous form. That is, the compound has the "breathability" qualities characteristic of leather and fabric.

Certain features above described are claimed in the copending application referred to.

What is claimed is:

1. The method of producing an article of wearing apparel or the like, which comprises forming a stable compound of rubber and nitrocellulose, spreading the compound on a base of fabric or the like to form a coating, causing the solvents in the coating compound to evaporate suddenly, and subjecting the coating to a curing operation.

2. The method of producing an article of wearing apparel or the like, which comprises forming a stable compound of rubber and nitrocellulose, spreading the compound on a base of fabric or the like to form a coating, subjecting the coating compound to a sudden application of heat, thereby to cause sudden evaporation of the solvents present, and subjecting the coating to a curing operation.

3. The method of producing an article of wearing apparel or the like, which comprises forming a stable compound of rubber and nitrocellulose, spreading the compound on a base of fabric or the like to form a coating, subjecting the coating compound to a sudden application of heat before any substantial evaporation of the solvents takes place, thereby to cause a sudden evaporation of such solvents, and subjecting the coating to a curing operation.

4. The method of producing an article of wearing apparel or the like, which comprises forming a stable compound of rubber and nitrocellulose, spreading the compound on a base of fabric or the like to form a coating, and causing the solvents in the coating compound to evaporate suddenly.

5. The method of producing an article of wearing apparel or the like, which comprises forming a stable compound of rubber and nitrocellulose, spreading the compound on a base of fabric or the like to form a coating, and subjecting the coating compound to a sudden application of heat, thereby to cause sudden evaporation of the solvents present.

6. The method of producing an article of wearing apparel or the like, which comprises forming a stable compound of rubber and nitrocellulose, spreading the compound on a base of fabric or the like to form a coating, and subjecting the coating compound to a sudden application of heat before any substantial evaporation of the solvents takes place, thereby to cause a sudden evaporation of such solvents.

HERBERT W. O'NEILL.